United States Patent
Gupta et al.

(10) Patent No.: US 12,314,239 B2
(45) Date of Patent: May 27, 2025

(54) REGIONALLY-BASED DATA STORAGE AND CONTROL

(71) Applicant: Bank of America Corporation, Charlotte, NC (US)

(72) Inventors: Nupur Gupta, London (GB); Harinath Meedinti Bhaskara Reddy, Charlotte, NC (US); Manu Kurian, Dallas, TX (US); Jayachandra Varma, Irvington, TX (US); Erica Perkins, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/201,283

(22) Filed: May 24, 2023

(65) Prior Publication Data

US 2024/0394233 A1 Nov. 28, 2024

(51) Int. Cl.
*G06F 16/22* (2019.01)

(52) U.S. Cl.
CPC .................... *G06F 16/22* (2019.01)

(58) Field of Classification Search
CPC ....................................... G06F 16/22
See application file for complete search history.

(56) References Cited

U.S. PATENT DOCUMENTS

| | | | | |
|---|---|---|---|---|
| 11,093,632 | B1* | 8/2021 | Ton-That | G06N 20/00 |
| 2012/0036125 | A1* | 2/2012 | Al-Kofahi | G06F 16/332 |
| | | | | 707/769 |
| 2016/0112391 | A1* | 4/2016 | Jamrog | G06F 16/24578 |
| | | | | 707/723 |
| 2018/0307859 | A1* | 10/2018 | LaFever | H04L 63/20 |
| 2021/0049155 | A1* | 2/2021 | Markovic | G06F 16/254 |
| 2021/0157858 | A1* | 5/2021 | Stevens | G06F 40/279 |
| 2021/0240849 | A1* | 8/2021 | Barday | G06F 16/22 |

\* cited by examiner

*Primary Examiner* — Jensen Hu
(74) *Attorney, Agent, or Firm* — Weiss & Arons LLP (57) ABSTRACT

A system for administering regionally-based data storage and control is provided. The system may include a computer processor and a distributed memory. The distributed memory may be distributed across a plurality of regions. The distributed memory may provide data storage. The system may build a plurality of artificial intelligence (AI) models. Each of the models may correspond to a set of data rules. Each of the data rules governs the storage of data in each of the plurality of regions. The system may further create, or otherwise access, a plurality of data keys. Each of the data keys preferably corresponds to one of the regions. The system preferably centralizes the location of the plurality of data keys in a central location such that control of the data in the plurality of regions can be administered by the processor, via the plurality of data keys, from the central location.

2 Claims, 7 Drawing Sheets

REGIONALLY-BASED DATA STORAGE AND CONTROL

FIELD OF TECHNOLOGY

Aspects of the disclosure relate to data storage and control.

BACKGROUND OF THE DISCLOSURE

Several countries maintain data locally. Certain of these countries do not typically permit data access, absent certain data storage rules, by foreign entities.

It would be desirable to enable a system with multiple, distributed keys.

It would be further desirable if such a system could preferably structure the keys as region-based keys.

It would be further desirable if such keys could be centralized in a single location.

It would be still further desirable for each of the keys to be used to access data in a discrete, and possibly protected, region.

It would be even more desirable to enable a centralized data control by leveraging such keys.

SUMMARY OF THE DISCLOSURE

A system for administering regionally-based data storage and control is provided. The system may include a computer processor. It should be noted that, for the purposes of this application, the terms processor, computer processor and microprocessor may be used interchangeably as set forth hereinbelow.

The system may also include a distributed memory. The distributed memory may preferably be distributed across a plurality of regions. The distributed memory may preferably be used for housing data storage for data located in the plurality of regions.

In some embodiments, the microprocessor may build a plurality of artificial intelligence (AI) models. Each of the models may correspond to a single one of a plurality of sets of data rules. Each of the plurality of sets of data rules may govern the storage of data in each of the plurality of regions.

In certain embodiments, the system may create a plurality of data keys based on the plurality of AI models. Each of the data keys may preferably correspond to one of the plurality of regions.

In addition, some embodiments of systems according to the disclosure may preferably centralize the location of the plurality of data keys in a central location. In such embodiments, control of the data in the plurality of regions can be administered by the processor. In such embodiments, control of the data may be administered via the plurality of data keys. In such embodiments, control of the data may be administered by the microprocessor. It should be noted that microprocessors may preferably be located in the central location. However, it is within the scope of the disclosure for the processor to be located in a different location from the central location of the keys.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

A system with multiple, distributed keys is provided. Such keys may be region-based keys that could be centralized in a single location. Such centralized keys could preferably be used to centralize data control although the data is maintained in disparate locations.

In addition, such regional data control can leverage training models formed from localized features as opposed to universally trained models.

Thereafter, these regional training models can be used to more accurately process data received from the various regions. An example of such a circumstance in which regional training models may be leveraged includes the following. A United States-based engineer has built data processing models absent features unique to Singapore. Yet a meshing of the US processing models may be combined with Singaporean data rules or models to produce a more tuned model for processing Singaporean data.

In some embodiments, a data mesh architecture could also preferably be sufficiently flexible to account for the various data privacy laws in different jurisdictions. For example, one jurisdiction may treat a customer phone number with one rule and another jurisdiction could treat the customer phone number with another rule. Alternatively, certain data can be masked in one data location and not in another. Also, the access to the regional models could be tuneable to make them more or less strict depending on the region.

In short, systems and methods according to the invention may include multiple, distributed keys such that region-based keys could be centralized in a single location. Such systems and methods enable a centralized data control, while maintaining in disparate locations, possibly under different data rule constructs.

A method for providing regionally-based data storage and control is provided. The method may include utilizing a computer processor and one or more non-transitory computer-readable media storing computer executable instructions. The instructions may implement the regionally-based data storage and control.

The method may include hosting, in a plurality of regions, data storage for data. The method may include building a plurality of artificial intelligence (AI) models. The building may involve a processor. Each of the models may correspond to a single one of a plurality of sets of data rules. Each of the plurality of sets of data rules may govern or otherwise control the storage of data in each of the plurality of regions.

The method may further include creating a plurality of data keys based on the plurality of AI models. The creating may be implemented using the processor. Each of the data keys may preferably correspond to one of the plurality of regions. The AI may include continuously or periodically receiving data from an API. The API may perform as a source of regional information. The regional information may inform the creating and/or maintenance of the keys.

Feedback may be provided as part of the AI process. The feedback may include following up and updating the keys with information derived from model performance.

The method may also involve centralizing the location of the plurality of data keys in a central location. The centralization may enable control of the data in the plurality of regions. Such control can, according to the embodiments set forth herein, be administered, via the plurality of data keys, from a central location.

The method may, under certain circumstances, receive, at the central location, an application programming interface (API) feed from each of the plurality of regions. The API feed from each of the plurality of regions may include an index of the data storage at each of the plurality of regions. The API feed preferably enables access to the data storage in each of the plurality of regions by leveraging the data key associated with a data key associated with the region.

The method may also include updating each of the plurality of AI models in response to updated rule information corresponding to each of the plurality of regions, said updated rule information received via the API feed.

In certain embodiments, each of the plurality of regions includes a separate country.

In some embodiments, each of the plurality of regions includes a separate legal jurisdiction.

At least one of the AI models may require masking of a customer phone number. In some embodiments at least one of the AI models requires masking of a customer social security number. It should be noted that any suitable requirements of a The plurality of models can be stored in computer memory at the central location.

The following figures and associated written specifications set forth the invention in additional detail to the foregoing.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
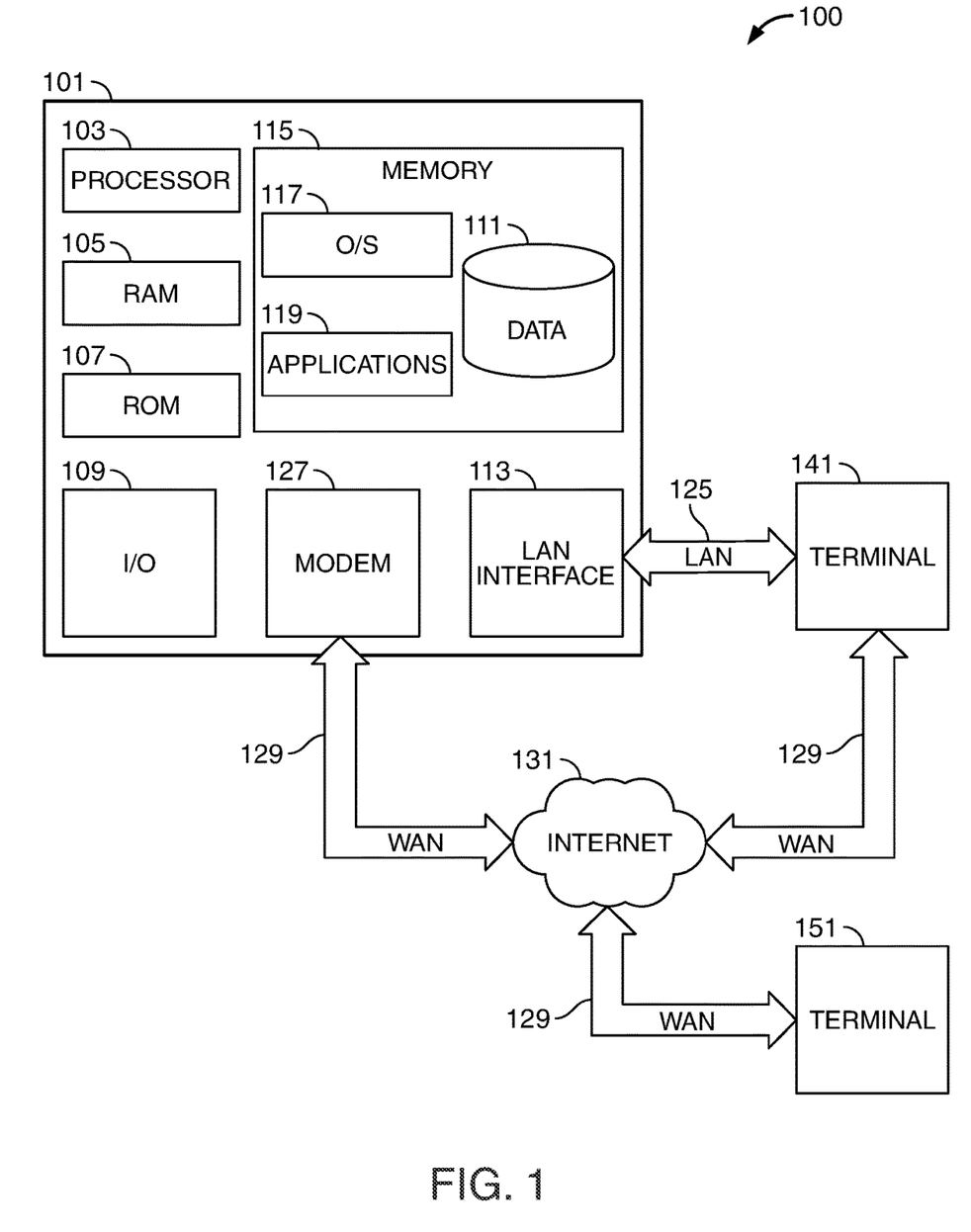
FIG. 1 shows an illustrative system in accordance with principles of the disclosure.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components commonly used for computers, such as EEPROM or Flash memory or any other suitable components, may also be part of the computer 101.

Memory 115 may be comprised of any suitable permanent storage technology—e.g., a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). Computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
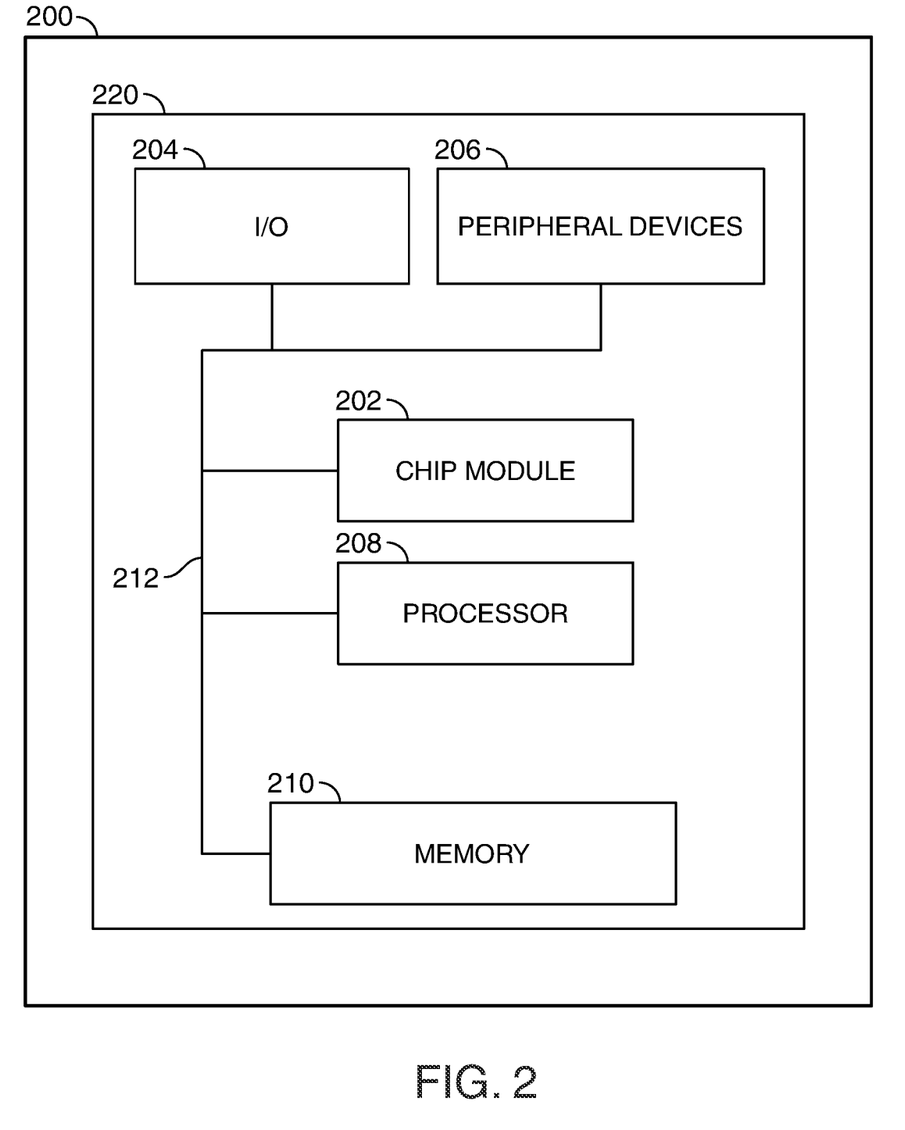
FIG. 2 shows an illustrative system in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
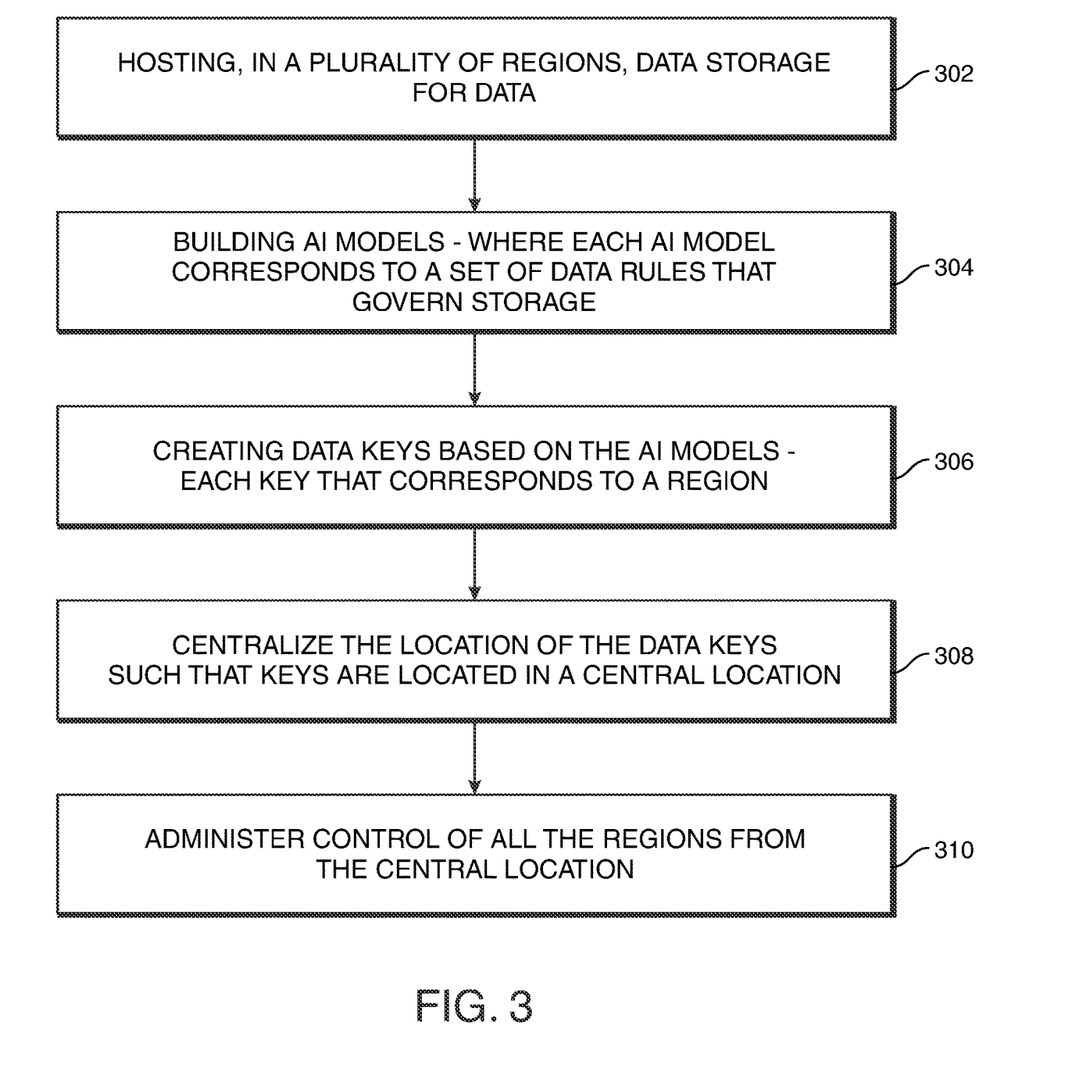
FIG. 3 shows a schematic diagram of an apparatus in the prior art.

FIG. 3 shows an illustrative flow diagram according to the principles of the disclosure. At 302, the diagram shows hosting, in a plurality of regions, data storage for data.

Step 304 shows using a processor for building artificial intelligence (AI) models. Each AI model preferably corresponds to a set of data rules that govern data storage in the various regions.

The processor may also be used to create data keys based on the AI models, as shown at 306. Each of the data keys preferably corresponds to a discrete region.

At 308, a step shows centralizing the location of the data keys. Such a step preferably enables all or at least some of the keys to be located in a central region. The foregoing is true, although each of the keys may control data storage in a disparate and remote region.

At 310, the keys may be used, by the processor, to administer control of data storage in all the regions. It should be noted that, in the embodiments set forth herein, control of the data storage in all the regions may preferably be administered or otherwise governed by a processor, or group of processors, located in a single region. It should be noted that the single region from which the processor governs or controls the data storage may preferably be the same region as the region in which all of the keys are located.

It should be noted further, that, if one of the keys was moved from the central region, the moved key may be deactivated. In such a circumstance, the system may no longer be able to control the data storage in the region to which the key was moved, and/or the region to which the key provided access.

Figure 4:
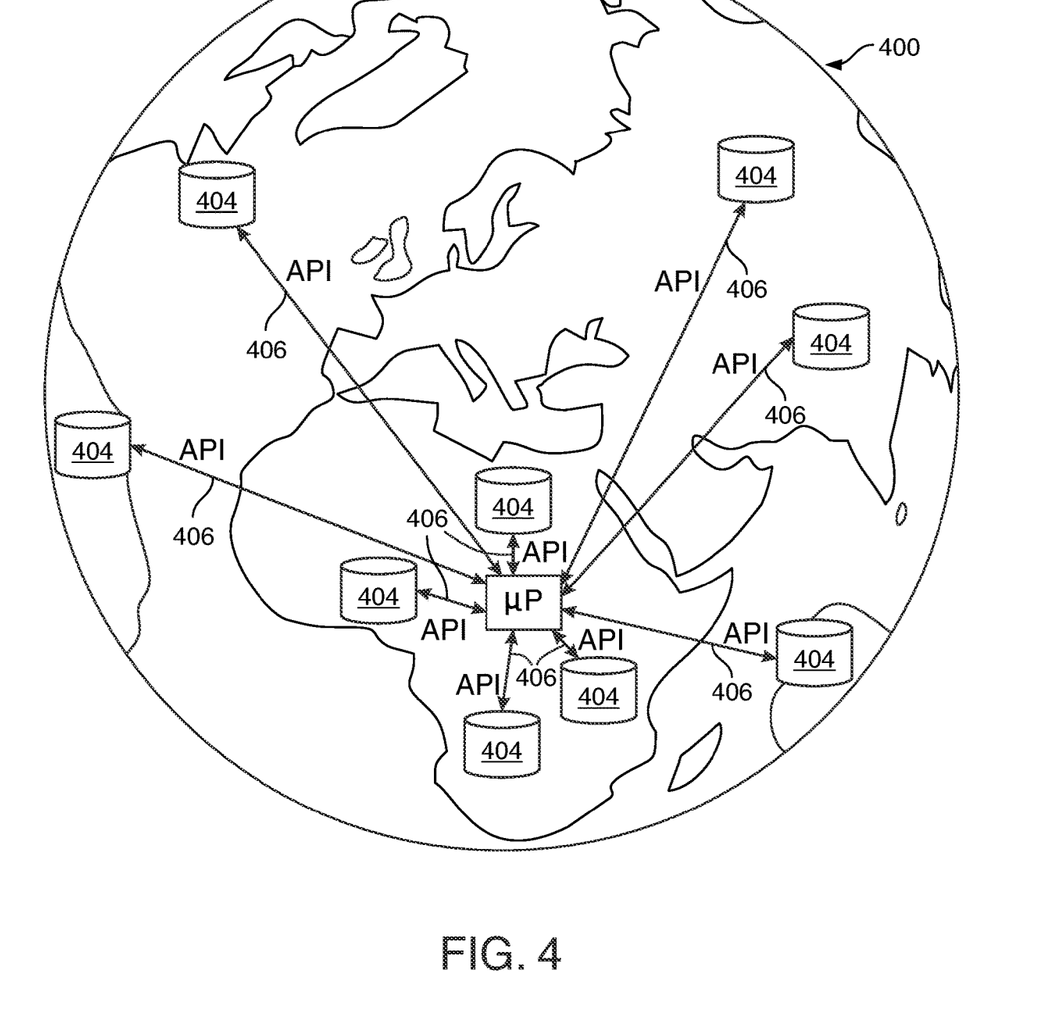
FIG. 4 shows another schematic diagram of another apparatus in accordance with principles of the disclosure.

FIG. 4 shows an illustrated system according to certain embodiments of the disclosure.

At 400, an exemplary map is shown of various regions in which data is stored. At 402, a microprocessor is shown. At 404, data storage is shown. Data storage 404 is shown as being located at various regions. In the exemplary FIG. 404, regions are shown as countries which may have varying laws, and present different legal jurisdictions. Nevertheless, it should be noted that the data storage may be located in various locations within the same country or jurisdiction.

At 406 an API feed is shown between each of the various data storage locations and the central processor. These API feeds 406 may, in one aspect, preferably provide information upon which processor can format, or update, AI models (not shown in FIG. 4). These AI models may include the data storage information and rules relevant to the individual regions. Furthermore, the AI models may enable control access to the data storage in the various regions. Absent the information in the AI models, control access to the data storage in the various regions may, under certain circumstances, be precluded.

Figure 5:
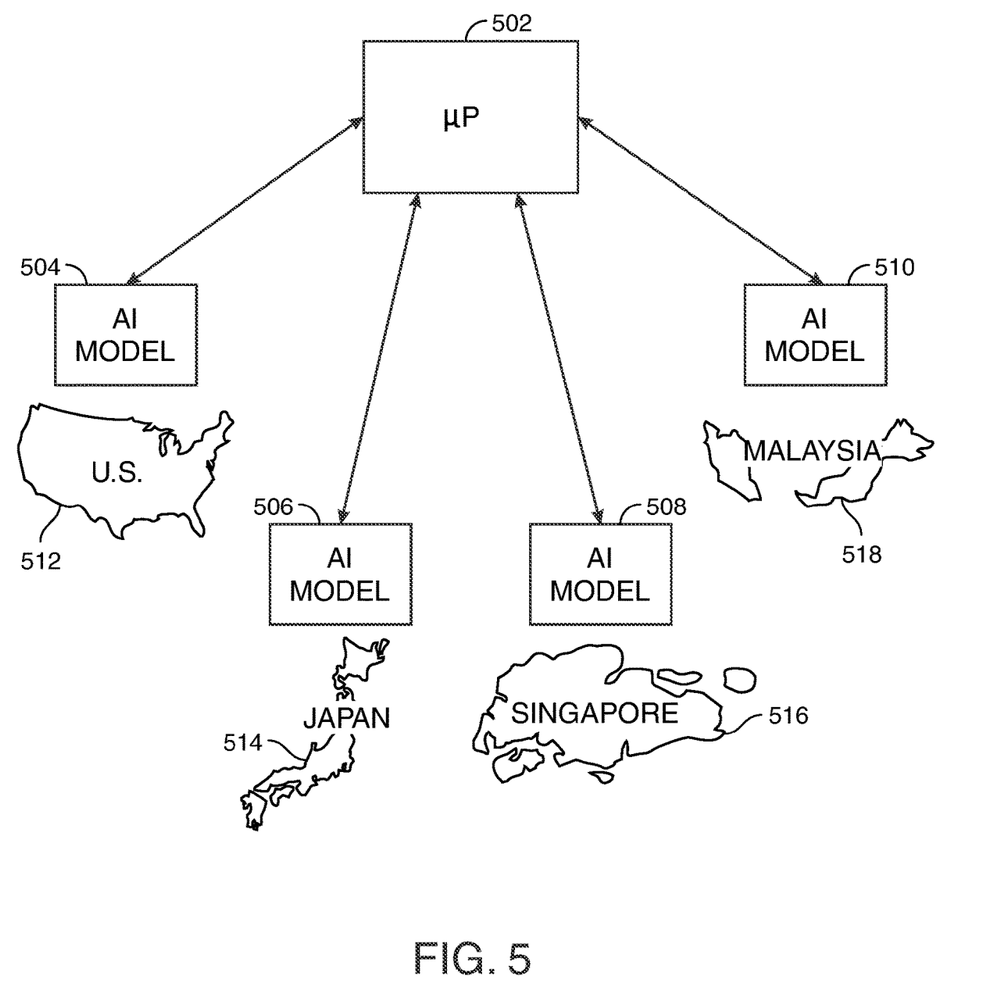
FIG. 5 shows still another schematic diagram of an apparatus in accordance with principles of the disclosure.

At FIG. 5 shows another schematic diagram of the principles reflecting embodiments of system. FIG. 5 shows a diagram of microprocessor 502 in communication with AI models 504.

It should be noted that each of the AI models is shown as coupled to an individual jurisdiction. For example, a first AI model is shown as coupled to the United States, a second is shown as coupled to Japan, a third is shown as coupled to Singapore and a fourth is shown as coupled to Malaysia.

Figure 6:
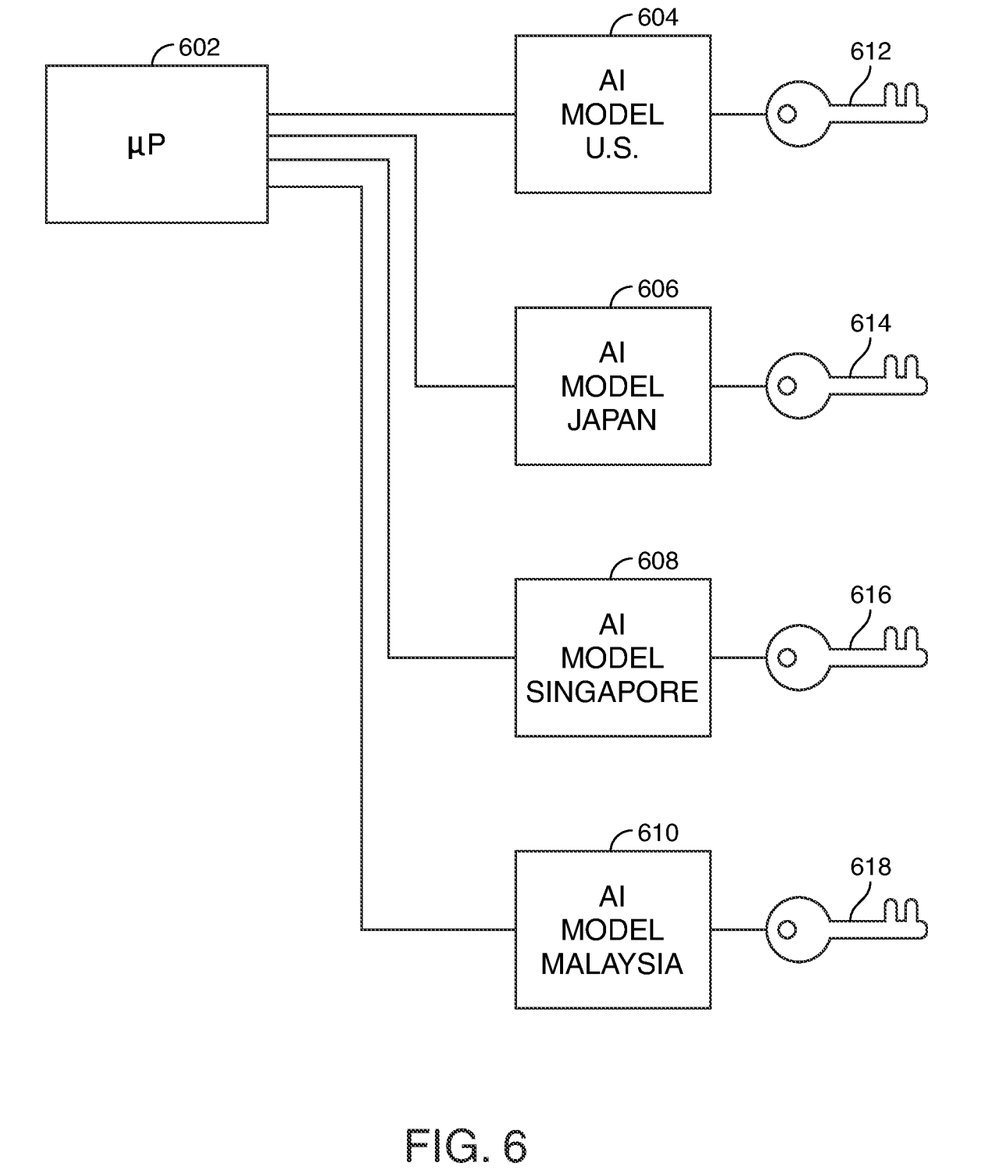
FIG. 6 shows yet another schematic diagram of an apparatus in accordance with principles of the disclosure.

FIG. 6 shows yet another diagram according to the principles of the disclosure. At 602, FIG. 6 shows a microprocessor. FIG. 6 shows AI model 604 for data storage in the US. FIG. 6 shows AI model 606 for data storage in Japan. FIG. 6 shows AI model 608 for data storage in Singapore. FIG. 6 shows AI model 610 for data storage in the Malaysia.

AI model 604 for data storage in the US is shown as coupled to key 612. FIG. 6 shows AI model 606 for data storage in Japan is shown as coupled to key 614. FIG. 6 shows AI model 608 for data storage in Singapore is shown as coupled to key 616. FIG. 6 shows AI model 610 for data storage in Malaysia is shown as coupled to key 618.

Figure 7:
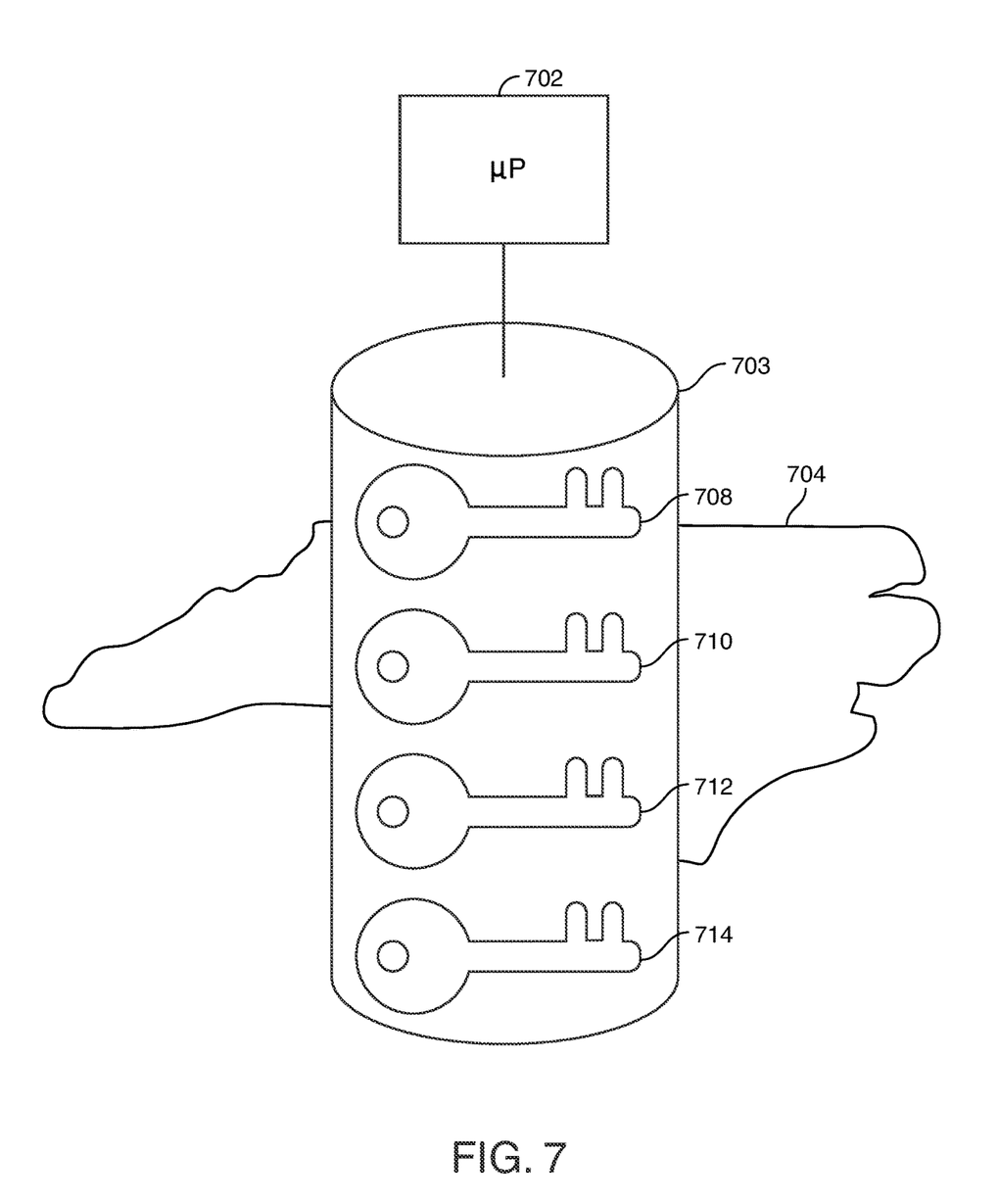
FIG. 7 shows still another schematic diagram of an apparatus in accordance with the principles of the disclosure.

FIG. 7 shows yet another schematic diagram according to the principles of the disclosure. At 702, a microprocessor is shown. A central storage location is shown at 703.

Central storage location 703 preferably stores a plurality of keys. As described above, each key may correspond to data storage located in one or more regions.

At 704, a single region is specified. This indicates that, while each of the keys may correspond to, and be used for controlling access to, an individual region, the embodiments set forth herein preferably include a system wherein each of the keys are stored in a single region. Further, processor 702 may also be located in the same region in which the various keys are located.

Thus, methods and apparatus for enabling regionally-based data storage and control are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for providing regionally-based data storage and a centralized data control in a data mesh architecture, the method comprising:
a computer processor and one or more non-transitory computer-readable media storing computer executable instructions, the computer executable instructions implement the regionally-based data storage and centrally-based data control in the data mesh architecture, the method comprising:
hosting, in a plurality of regions in the data mesh architecture, data storage for data, where each of the plurality of regions comprises a separate country and/or a separate legal jurisdiction;
building, using the computer processor, a plurality of artificial intelligence (AI) models in the data mesh architecture, each of the AI models that corresponds to a single one of a plurality of sets of data rules, each of the plurality of sets of data rules that govern a storage of data in each of the plurality of regions in the data mesh architecture, where the plurality of AI models is stored in computer memory at a central location, and at least one of the AI models requires masking of a customer phone number and/or a customer social security number;
creating, using the computer processor, a plurality of data keys based on the plurality of AI models, each AI model in the plurality of AI models is coupled to a data key, each AI model is coupled to a region, and each of the data keys corresponds to one of the plurality of regions in the data mesh architecture;
centralizing a location of the plurality of data keys in the central location such that control of the data in the plurality of regions can be administered, via the plurality of data keys, from the central location in the data mesh architecture;
receiving, at the central location in the data mesh architecture, an application programming interface (API) feed from each of the plurality of regions, where the API feed comprises an index of the data storage at each of the plurality of regions, and the API feed enables access to the data storage in each of the plurality of regions by leveraging a data key associated with the region; and
updating each of the plurality of AI models in response to updated rule information corresponding to each of the plurality of regions in the data mesh architecture, said updated rule information received via the API feed;
wherein:
the API feed provides each of the plurality of AI models with regional data;
each of the plurality of AI models is trained with data from regional information, said regional information is related to a region in which the AI model is coupled;
access to data in the data storage in each region is determined by an AI model for that region, using pre-determined criteria that corresponds to a set of data rules such that access to data in some regions is stricter than access to data in other regions;
when a data key from one of the plurality of data keys is moved from the central location, the data key is deactivated;
when the data key is deactivated, the API feed no longer enables access to the data storage in the region controlled by the data key.

2. A system for administering regionally-based data storage and centrally-based data control in a data mesh architecture, the system comprising:
- a computer processor located in the data mesh architecture;
- a distributed memory, said distributed memory distributed across a plurality of regions in the data mesh architecture, said distributed memory for storing data storage for data;
- wherein the computer processor is configured to:
  - host, in a plurality of regions in the data mesh architecture, data storage for data;
  - build a plurality of artificial intelligence (AI) models in the data mesh architecture, each of the AI models that corresponds to a single one of a plurality of sets of data rules, each of the plurality of sets of data rules that govern a storage of data in each of the plurality of regions in the data mesh architecture, where the plurality of AI models is stored in computer memory at a central location, and at least one of the AI models requires masking of a customer phone number and/or a customer social security number;
  - create a plurality of data keys based on the plurality of AI models, each AI model is coupled to a data key, each AI model in the plurality of AI models is coupled to a region, and each of the data keys corresponds to one of the plurality of regions in the data mesh architecture;
  - centralize a location of the plurality of data keys in the central location such that control of the data in the plurality of regions can be administered by the computer processor, via the plurality of data keys, from the central location in the data mesh architecture;
  - receive at the central location in the data mesh architecture, an application programming interface (API) feed from each of the plurality of regions, where the API feed comprises an index of the data storage at each of the plurality of regions, and the API feed enables access to the data storage in each of the plurality of regions by leveraging a data key associated with the region; and
- update each of the plurality of AI models in response to updated rule information corresponding to each of the plurality of regions in the data mesh architecture, said updated rule information received via the API feed;
- wherein:
  - each of the plurality of regions comprises a separate country and/or a separate legal jurisdiction;
  - the API feed provides each of the plurality of AI models with regional data;
  - each of the plurality of AI models is trained with data from regional information, said regional information is related to a region in which the AI model is coupled;
  - access to data in the data storage in each region is determined by an AI model for that region, using pre-determined criteria that corresponds to a set of data rules such that access to data in some regions is stricter than access to data in other regions;
  - when a data key from one of the plurality of data keys is moved from the central location, the data key is deactivated;
  - when the data key is deactivated, the API feed no longer enables access to the data storage in the region controlled by the data key.

\* \* \* \* \*